March 29, 1960

G. ERNST 2,930,549

CONTROL DEVICE FOR VERTICAL LANDING

Filed Aug. 8, 1955

INVENTOR
GÜNTHER ERNST

BY
Watson, Cole, Grindle & Watson
ATTORNEYS

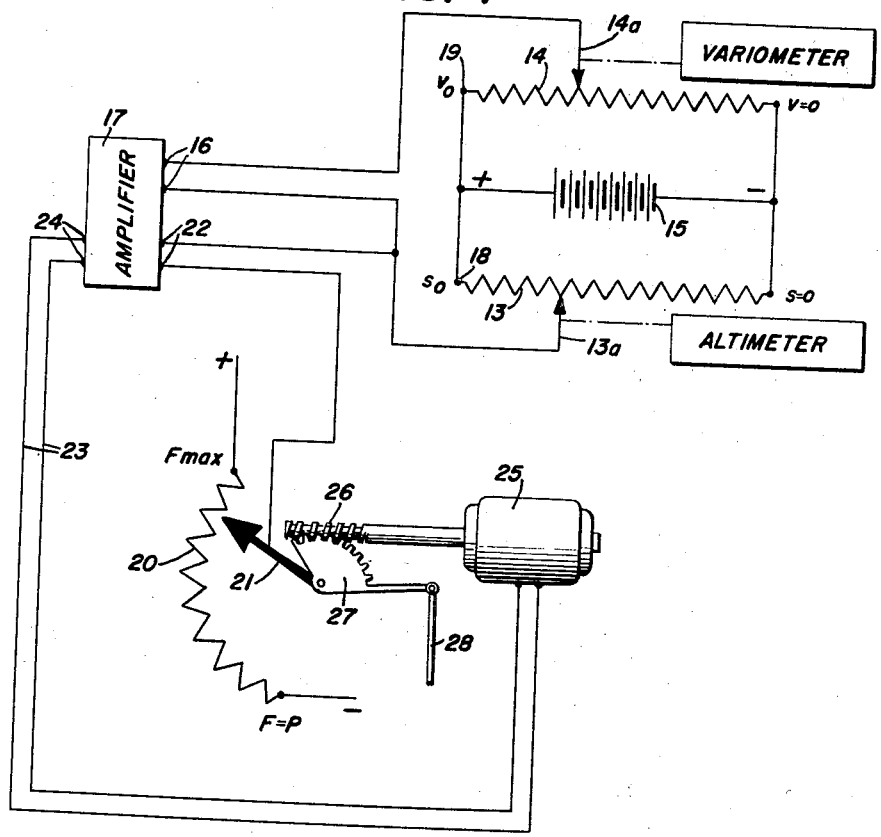

United States Patent Office 2,930,549
Patented Mar. 29, 1960

2,930,549

CONTROL DEVICE FOR VERTICAL LANDING

Günther Ernst, Dammarie-les-Lys, France, assignor to Societe Nationale d'Etude et de Construction de Moteurs d'Aviation, Paris, France, a French company Application August 8, 1955, Serial No. 527,108

Claims priority, application France August 11, 1954

3 Claims. (Cl. 244—77)

During vertical landings of aircraft which are specially designed for this purpose and which are generally jet-propelled, the instantaneous values of the speed and the acceleration (negative) of descent, depend on the ratio of the thrust of the propulsive unit, directed upwards, to the weight of the device. The determination of the dimensions of the landing gear requires that the speed of the device at the moment at which it comes into contact with the ground, does not exceed a certain limit. In practice, it is preferable to land at a speed in the vicinity of zero.

The present invention has for its object to provide a device which can be put into action below a certain altitude in order to enable the thrust to be regulated with a view to obtaining this low or zero landing speed. This device comprises a detector of the altitude and of its variation as a function of time, that is to say of the speed of descent, as well as a means for comparing the instantaneous values of the altitude and the speed, this comparison device making it possible to verify that the instantaneous values of the altitude and the speed correspond to a predetermined law of variation in order to obtain a low or zero speed when landing.

In order to obtain an automatic action on the thrust, a device of this kind may be combined with a motor which acts on the control member of the propulsion unit so as to cause the thrust to vary in accordance with the instantaneous difference of the speed of descent with respect to the pre-determined law.

The description which follows below with reference to the attached drawings (which are given my way of example only and not in any sense by way of limitation) will make it quite clear how the invention may be carried into effect.

Fig. 4 is a diagrammatic view in plan of a form of embodiment combined with automatic correction of the thrust.

Figure 1:
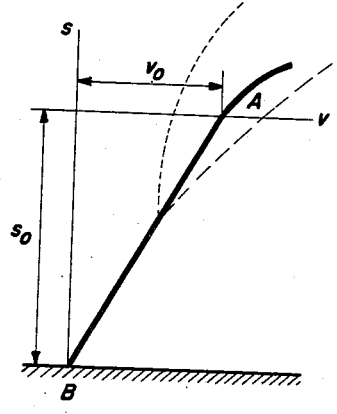
Figs. 1 and 2 are two explanatory diagrams of a law of variation of the speed and the thrust as a function of the altitude, this law serving as a basis for a preferred form of embodiment of the invention.

The diagram of Fig. 1 has been plotted with the altitude $s$ as ordinates and the values corresponding to the instantaneous speed of descent as the abscissae. The ordinate $s_0$ of the point A is the altitude at which the device which will be described below comes into action. There has been drawn in full line from A to B (the touch-down point at zero speed) an ideal law of descent, for which the vertical speed of descent of the device, which has the value $v_0$ at the altitude $s_0$, decreases in a linear manner down to zero at the point B at which the device touches the ground so that the instantaneous altitude $s$ and the instantaneous speed $v$ are connected by the relation $$v = \frac{v_0}{s_0} s$$

If this equation is differentiated with respect to time in order to calculate the acceleration of descent, and if the thrust of the reaction unit directed upwards is designated by F, the total weight of the device by P and its mass by M, there is finally obtained:

$$\frac{F-P}{M} = \frac{v_0^2}{s_0^2} s$$

that is to say:

$$F = P + M\left(\frac{v_0}{s_0}\right)^2 s$$

Figure 2:
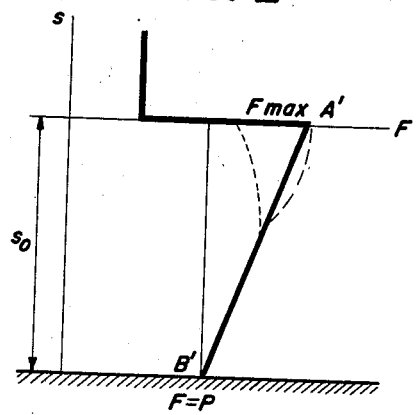

The diagram of Fig. 2 shows from A' to B' (A' corresponding to the altitude $s_0$ and B' to the touch-down point) the variation of the instantaneous thrust as a function of the altitude for landing at zero speed. Above the altitude $s_0$, the descent was made with a thrust smaller than the weight. When the altitude $s_0$ is reached, the thrust is regulated to a maximum value:

$$F_{\max} = P + M\left(\frac{v_0}{s_0}\right)^2 s_0$$

after which it is reduced in a linear manner down to the point B' at which it should exactly balance the weight P.

Figure 3:
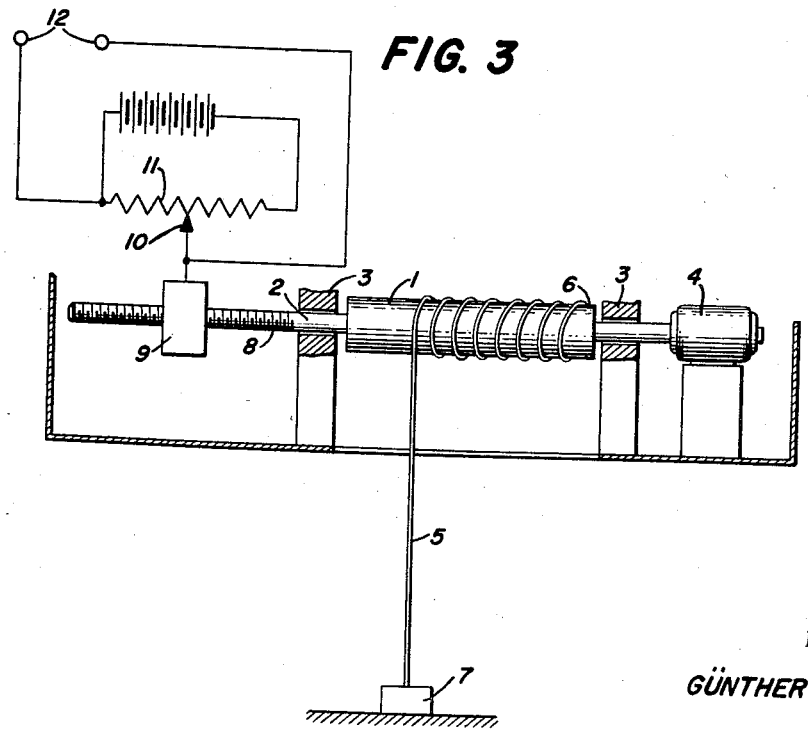
Fig. 3 is a diagrammatic view in elevation of a form of construction of a detector of the instantaneous values of the altitude and of the speed of descent.

The altitude detector which is shown in Fig. 3 comprises, on the aircraft, a drum 1 mounted on a shaft 2 journalled in bearings 3 and driven by a motor 4. The drum 1 serves to wind up a thread or cable 5 one end 6 of which is attached to the drum, a weight 7 being fixed to the other end. The length of the cable between its two extremities is equal to the altitude $s_0$. The motor 4 is designed so as to apply to the drum 1 a torque tending to wind up the cable 5, but only just sufficient to withstand the opposing couple applied to the drum by the weight 7. The shaft 2 is provided with a threaded portion 8 cooperating with a nut 9 linked to a slider 10 of a potentiometer 11, so that the difference of potential at the terminals 12 is variable with the position of the nut 9.

A little before the aircraft reaches altitude $s_0$ during its descent, the cable 5 is completely unwound and, at that moment, the nut 9 occupies its extreme left-hand position for which the slider 10 is on the left-hand extremity of the potentiometer 11, giving no voltage across the terminals 12. From the moment at which the weight 7 touches the ground, at the altitude $s_0$, the motor 4 winds up the cable 5 as and when the altitude diminishes, the slider 10 is displaced towards the right, thus causing the voltage to increase across the terminals 12 proportionally to the altitude. The detection of this voltage enables the instantaneous altitude to be determined. The detection of the variation of this voltage as a function of time, for example by means of a differentiating electric circuit known per se, or by means of a tachometer, enables the instantaneous speed of descent $v$ to be obtained. The comparison of the values of $v$ and of $s$ with respect to the law which has been previously fixed, shows the divergences of $v$ and the thrust is corrected accordingly so as to bring $v$ back to the desired value.

The cable altimeter which has been described above may, of course, be replaced by any other type of altimeter (e.g. precision altimeter).

Fig. 4 shows a device which acts automatically on the thrust. The potentiometers 13 and 14, connected across a common source 15, are mounted as a Wheatstone bridge network. The sliders 13a and 14a of these potentiometers form the ends of the diagonal branch of this bridge and are connected to input terminals 16 of an electric amplifier 17. The slider 13a is displaced in accordance with variation of altitude between $s_0$ and the ground. It may be controlled by any conventional altimeter and its position along the potentiometer 13 therefore depends on the instantaneous altitude $s$.

The slider 14a is displaced in such manner that its distance to the origin 19 of the potentiometer 14 is proportional to the instantaneous value of the speed of descent $v$. The slider 14a may be displaced by any conventional variometer.

In this way, when the positions of the sliders 13a and 14a correspond with each other in accordance with the chosen law relating the altitude to the instantaneous speed, the bridge is in equilibrium and no current flows towards the terminals 16.

The potentiometer 13 and a third potentiometer 20 are connected to form a second Wheatstone bridge which can be supplied by the same source 15 as the first bridge (the positive and negative terminals of this source being respectively connected to the positive and negative terminals of the potentiometer 20). In the diagonal branch of this second bridge are inserted the slider 13a and the slider 21 of the potentiometer 20 together with two further input terminals 22 of the amplifier 17, the latter being arranged so as to discharge into a circuit 23 coupled to its output terminals 24 a current which is proportional to the algebraic sum of the voltages applied at 16 and 22. The circuit 23 energizes an electric motor 25 arranged so as to rotate in one direction or in the other, depending on the direction of the current in the circuit 23 and controlling, for example, by means of an endless screw 26 and a toothed segment 27, the rotation of the slider 21 as well as the movement of a rod system 28 which acts on the control member of the jet propulsion unit (e.g. the fuel throttle lever) that is to say on the value of the thrust.

The members are so arranged that the bridge 13—20 is in equilibrium when the position of the rod system 28 coupled to the slider 21 corresponds to the production by the reaction unit of a thrust F which is related to the instantaneous value of the altitude $s$ by the predetermined law.

When the sliders 13a and 14a are moved along the bridge 13—14 following the desired law which relates $v$ to $s$, the terminals 16 do not collect any voltage. On the other hand, the movement of the slider 13a causes small fluctuations of voltage to be applied on the terminals 22 and the motor 25 is thus energised each time so as to displace the fuel throttle lever and the slider 21 with a view to restoring constantly the equilibrium of the bridge 13—20, the thrust thus following the law which has been fixed to relate its instantaneous value to that of the altitude $s$.

If, at any given moment, the bridge 13—14 is unbalanced because the speed of descent differs from the value required, a supplementary fluctuation of voltage appears in the circuit 23 and this fluctuation acts on the motor 25 so as to modify the value of the thrust with a view to correcting the difference in speed.

It will of course be understood that any kind of network-corrector device may be added between the amplifier 17 and the motor 25 so as to compensate for the time lag which exists between the appearance of a control current at the terminals 16 and the corresponding modification of the thrust.

It will also be obvious that modifications may be made to the devices which have just been described, in particular by the substitution of equivalent technical means, without thereby departing from the spirit or from the scope of the present invention. In particular, the case may be conceived in which the bridge 13—14 would be used alone and the thrust control device would then be actuated by hand in order to maintain constantly at a zero value the current at the terminals 16. These terminals would then be those of a visual indicator responsive to the direction of the out-of-balance current in the bridge 13—14.

What I claim is:

1. In a vertical take-off and landing aircraft powered by a plant capable of supplying an upward thrust greater than the total weight of the aircraft, an automatic landing control device comprising altitude detecting means, rate-of-change of altitude detecting means, interconnecting means between said detecting means responsive to the ratio of the values detected thereby and generating a signal whose magnitude and sign depend on the deviation of said ratio from a predetermined value, operative means for collecting said signal, and means under the control of said operative means, for varying the thrust of said plant in a way which tends to reduce said deviation.

2. Device as claimed in claim 1 wherein the altitude detecting means comprises a potentiometer having a slider movable in accordance with the altitude of the aircraft to generate a voltage proportional to said altitude, the rate-of-change of altitude detecting means comprises a further potentiometer having a slider movable in accordance with the descent velocity of the aircraft to generate a voltage proportional to said descent velocity, and the signal collecting means comprises an electrical control arrangement having an input circuit responsive to the difference of said voltages and an output circuit controlling the thrust varying means.

3. Device as claimed in claim 2 wherein the thrust varying means comprises a third potentiometer having a slider movable in accordance with the thrust of the power plant to generate a voltage proportional to said thrust, and the electrical control arrangement comprises a further input circuit responsive to the difference of the voltages generated by said third potentiometer and by the first-mentioned potentiometer.

References Cited in the file of this patent

UNITED STATES PATENTS

| 1,826,938 | Kiss | Oct. 13, 1931 |
| 1,997,412 | Fischel | Apr. 9, 1935 |
| 2,650,046 | Vanderlys | Aug. 25, 1953 |